(12) United States Patent
Miller et al.

(10) Patent No.: US 6,459,368 B1
(45) Date of Patent: Oct. 1, 2002

(54) METHOD AND APPARATUS FOR SHIFTING AN AUTOMATIC TRANSMISSION

(75) Inventors: Scott A Miller, Chesterfield, MO (US); Edward W Czarnecki, Shelby Township, MI (US); Gregory G Sullivan, Waterford, MI (US); John M Rzepecki, II, Clinton Township, MI (US); Rita D Hollingsworth, Ortonville, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/558,531

(22) Filed: Apr. 26, 2000

(51) Int. Cl.⁷ .................................................. B60Q 1/00
(52) U.S. Cl. ............................ 340/456; 74/335; 74/866
(58) Field of Search .................................. 340/456, 441, 340/439, 458; 74/335, 866; 200/61.88

(56) References Cited

U.S. PATENT DOCUMENTS

| | | | |
|---|---|---|---|
| 4,669,335 A | * | 6/1987 | Matsuoka et al. ............ 74/866 |
| 4,704,560 A | | 11/1987 | Mills et al. |
| 4,733,580 A | * | 3/1988 | Kubo et al. .................... 74/866 |
| 4,777,848 A | * | 10/1988 | Taga et al. ..................... 74/866 |
| 4,972,737 A | * | 11/1990 | Makimoto ..................... 74/859 |
| 5,197,344 A | * | 3/1993 | Maier et al. ................... 74/335 |
| 5,406,303 A | * | 4/1995 | Salmon et al. ................. 345/75 |
| 5,420,565 A | | 5/1995 | Holbrook |
| 5,563,622 A | | 10/1996 | Person et al. |
| 5,767,769 A | | 6/1998 | Issa |
| 5,861,800 A | | 1/1999 | Peters et al. |
| 5,861,803 A | | 1/1999 | Issa |

* cited by examiner

*Primary Examiner*—John Tweel
(74) *Attorney, Agent, or Firm*—Edwin W. Bacon, Jr.

(57) ABSTRACT

A method for providing a shift position indication in an automatic transmission comprising the steps of providing a display device, sensing a position of an input device, the input device being responsive to manipulation by a driver and having a plurality of input positions, sensing an active gear ratio, and modifying the display device to display the position of the input device and the active gear ratio. An apparatus for displaying information on both the position of the shift lever and the activated gear ratio is also provided.

5 Claims, 3 Drawing Sheets

METHOD AND APPARATUS FOR SHIFTING AN AUTOMATIC TRANSMISSION

BACKGROUND OF THE INVENTION

1. Technical Field

The present invention relates generally to vehicle gear shift (PRNDL) displays and more particularly to a vehicle gear shift display which indicates both the position of a gear shift lever and a currently active gear ratio.

2. Discussion

Generally, conventional shift lever position displays (PRNDL displays) for automatic transmissions provide the vehicle operator with an indication of the position of the shift lever. Where the transmission may also be operated in a 'manual' automatic mode (i.e., the driver determines the timing of the shift but activation of the transmission clutches is performed automatically), several types of PRNDL displays are also operable in a mode wherein the activated gear ratio is displayed. One drawback of these PRNDL displays is that no feedback on both the position of the shift lever and the activated gear ratio is provided to the vehicle operator. Information on both the position of the shift lever and the activated gear ratio is desirable in that it permits the vehicle operator to monitor the configuration and performance of the vehicle when the transmission is controlled in an automatic mode.

SUMMARY OF THE INVENTION

It is one object of the present invention to provide a method for providing a shift position indication in an automatic transmission wherein information on both the position of the shift lever and the activated gear ratio is displayed to the vehicle operator.

It is another object of the present invention to provide an apparatus for displaying information on both the position of the shift lever and the activated gear ratio.

In one form, the present invention provides a method for providing a shift position indication in an automatic transmission comprising the steps of providing a display device, sensing a position of an input device, the input device being responsive to manipulation by a driver and having a plurality of input positions, sensing an active gear ratio, and modifying the display device to display the position of the input device and the active gear ratio. An apparatus for displaying information on both the position of the shift lever and the activated gear ratio is also provided.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
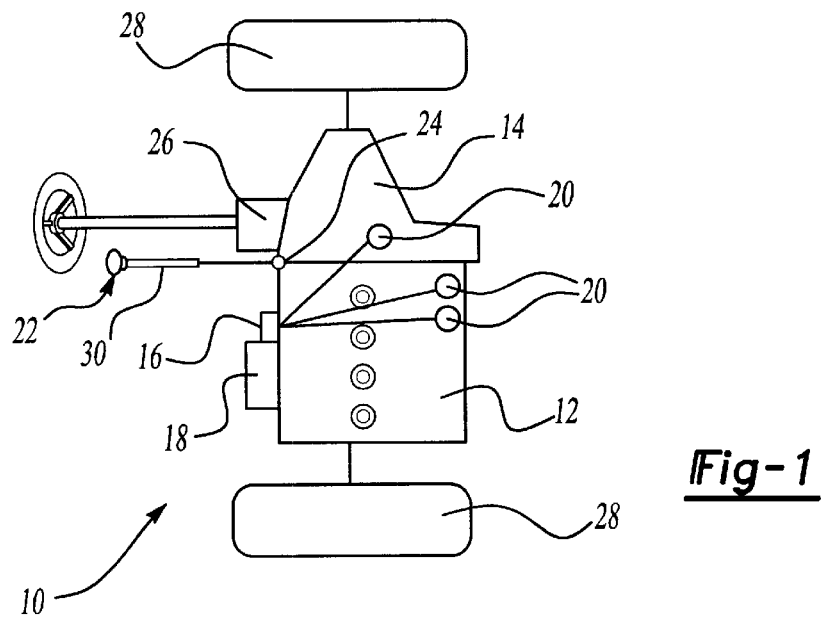
FIG. 1 is a schematic illustration of a portion of a vehicle constructed in accordance with the teachings of the present invention.
Figure 2:
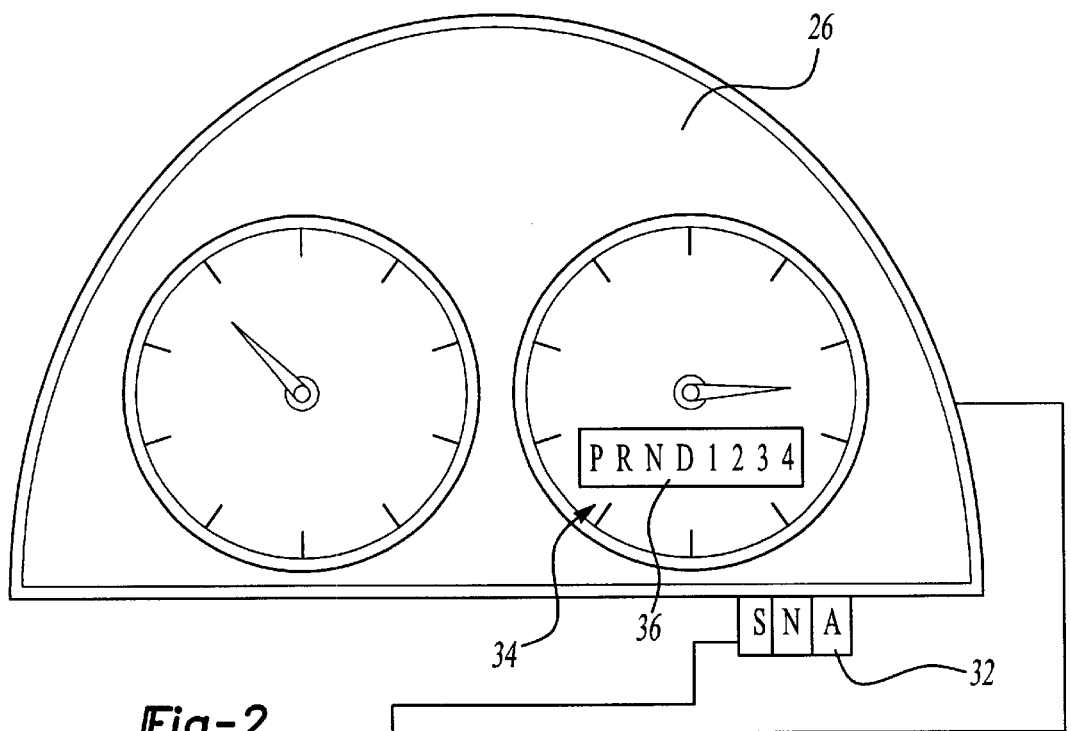
FIG. 2 is a schematic illustration of a portion of the vehicle of FIG. 1 illustrating the vehicle dash panel.
Figure 2:
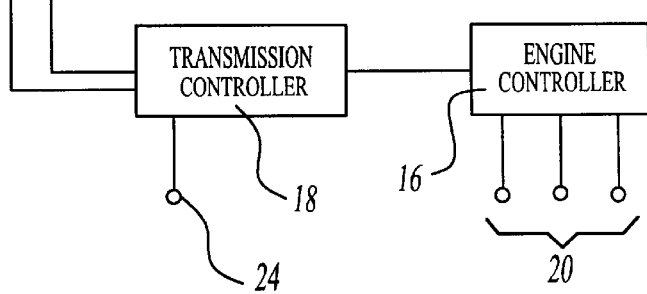

With reference to FIGS. 1 and 2, a vehicle is schematically indicated by reference numeral 10. In the particular embodiment illustrated, vehicle 10 is shown to include an engine 12, an automatic transmission 14, an engine controller 16, a transmission controller 18, a plurality of first sensors 20, an input device 22, at least one second sensor 24 and a display device 26. Engine 12, transmission 14, engine controller 16 and the plurality of first sensors 20 are conventional in their construction and operation and as such, need not be described in detail. Briefly, engine 12 is operable for providing a rotational output which is received by transmission 14. Transmission 14 includes a plurality of gear ratios which are operable in an active mode for transmitting drive torque to the vehicle wheels 28 and an inactive mode in which they do not transmit drive torque. In the example provided, transmission 14 includes a first gear ratio, a second gear ratio, a third gear ratio and a fourth or overdrive gear ratio. First sensors 20 are coupled to vehicle 10 and are operable for sensing a plurality of vehicle dynamics and outputting a plurality of first sensor signals in response thereto. At least one of the plurality of first sensors 20 is coupled to transmission 14 and is operable for producing a gear ratio signal indicative of the active gear ratio. Engine controller 16 receives the first sensor signals and controls the operation of the engine 12 in response thereto.

Transmission controller 18 is coupled to transmission 14 and is operable for selectively activating and de-activating each of the plurality of gear ratios according to a predetermined shift schedule, the plurality of first sensor signals including the gear ratio signal, and the position signal (discussed below). Preferably, transmission controller 18 is selectively operable in a first automatic mode having a first predetermined shift schedule, a second automatic mode having a second predetermined shift schedule and a manual forward mode having a driver determined shift schedule. Transmission controller 18 is adapted in each of the first and second automatic modes to responsively shift transmission 14 in response to the plurality of first sensor signals. Transmission controller 18 is also coupled to engine controller 16 and display device 26 to permit sharing of various vehicle, engine and transmission data. In the example provided, transmission controller 18, engine controller 16 and display device 26 are coupled via a multiplex data bus.

Input device 22 is operable for cooperating with transmission controller 18 to control the operation of transmission 14. Input device 22 is responsive to manipulation by a driver and is positionable in a plurality of input positions. The second sensor 24 determines the position of the input device 22 and produces a position signal in response thereto. In particular, input device 22 is shown to include a lever 30 which may be operated as described in commonly assigned U.S. application Ser. No. 09/316,314 entitled "Apparatus and Method for Selecting a Manual Mode of Shifting an Automatic Transmission", U.S. application Ser. No. 09/316,605 entitled "Apparatus and Method for Providing Automatic Shift Modes in an Automatic Transmission", and U.S. application Ser. No. 09/316,946 entitled "Apparatus and Method for Manually Shifting an Automatic Transmission", all of which are hereby incorporated by reference as if fully set forth herein. Those skilled in the art will understand that input device 22 could also be a conventional shift lever for an automatic transmission which is coupled to the transmission via a link member for shifting the position of a spool valve to direct hydraulic fluid in a predetermined manner.

Display device 26 is illustrated in FIG. 2 to include a display mode selector switch 32 and a gear lever position display (PRNDL display) 34 having a plurality of display positions 36. Display device 26 is coupled and responsive to transmission controller 18. PRNDL display 34 is preferably a vacuum fluorescent display which is selectively operable in a plurality of modes. Operation of PRNDL display 34 in a first display mode causes the continuous illumination of the display position 36 that corresponds to the position of the input device 22. Operation of PRNDL display 34 in a second display mode causes the illumination of the display position or positions that correspond to the active gear ratio and the position of the input device 22. Operation of the PRNDL display 34 in a third display mode causes the illumination of the display position that corresponds to the active gear ratio. Display mode selector switch 32 is operable for transmitting a mode input signal to display device 26 to switch PRNDL display 34 between the first, second and third display modes. Those skilled in the art will understand that display mode selector switch 32 may be comprised of two or more switches located throughout vehicle 10 to permit one or more of the display modes to be actuated automatically upon the sensing of a predetermined condition. For example, second sensor 24 may be employed to automatically actuate one of the display modes when the input device 22 is moved to a predetermined position.

Figure 3:
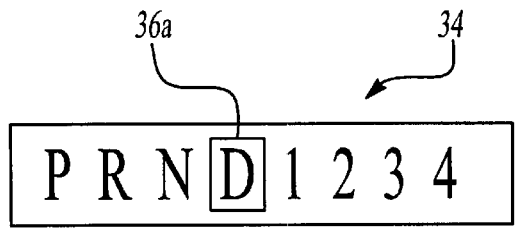
FIG. 3 illustrates a portion of the display device of FIG. 2 as operated in a first operational mode.

FIG. 3 illustrates the operation of the PRNDL display 34 in the first display mode. In this example, transmission controller 18 operates in the first automatic mode wherein transmission 14 is controlled according to a first shift schedule that conventionally upshifts and downshifts from one gear ratio to another gear ratio without manipulation of the input device 22. Accordingly, when the transmission controller 18 is operated in the first automatic mode and the driver positions the input device 22 in the "D" position, the PRNDL display 34 will continuously illuminate the display position 36a corresponding to "D" regardless of which of the actual forward gear ratios is active.

Figure 4:
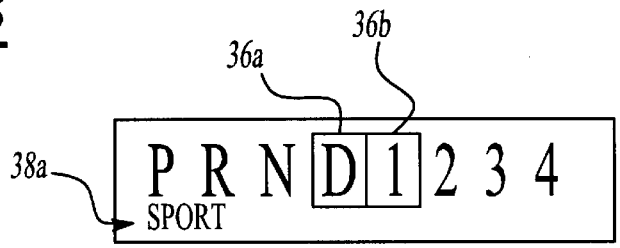
FIGS. 4 through 7 illustrate a portion of the display device of FIG. 2 as operated in a second operational mode.

FIGS. 4 through 7 illustrate the operation of the PRNDL display 34 in a second display mode. A mode indicator 38a indicates to the vehicle operator that the display device 26 is being operated in the second display mode. In this example, the input device 22 is placed in the "D" position and vehicle 10 is proceeding from a stop at a relatively low rate of speed. Accordingly, display positions 36a and 36b are illuminated as shown in FIG. 4 as they corresponding to the placement of the input device 22 in the "D" position and the operation of transmission 14 in the first gear ratio, respectively.

Figure 5:
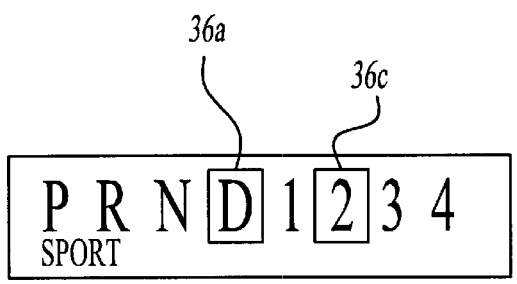

As the speed of vehicle 10 increases, transmission controller 18 causes transmission to upshift to the second gear ratio and the PRNDL display 34 updates as illustrated in FIG. 5. As shown, display positions 36a and 36c are illuminated as they corresponding to the placement of the input device 22 in the "D" position and the operation of transmission 14 in the second gear ratio, respectively.

Figure 6:
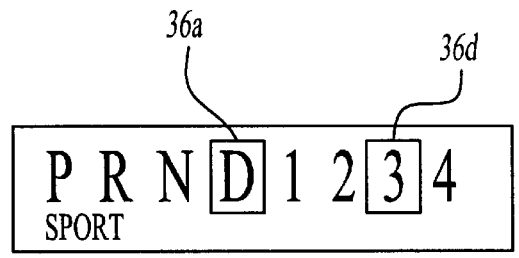

When the speed of vehicle 10 increases sufficiently, transmission controller 18 causes transmission to upshift to the third gear ratio and the PRNDL display 34 updates as illustrated in FIG. 6. As shown, display positions 36a and 36d are illuminated as they corresponding to the placement of the input device 22 in the "D" position and the operation of transmission 14 in the third gear ratio, respectively.

Figure 7:
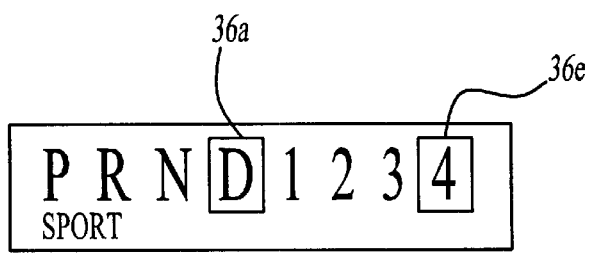

As the speed of vehicle 10 further increases, transmission controller 18 causes transmission to upshift to the fourth or overdrive gear ratio and the PRNDL display 34 updates as illustrated in FIG. 7. As shown, display positions 36a and 36e are illuminated as they corresponding to the placement of the input device 22 in the "D" position and the operation of transmission 14 in the fourth or overdrive gear ratio, respectively.

The operation of the PRNDL display 34 may be associated with a predetermined shift schedule, such as an enhanced (aggressive) performance schedule or an overdrive schedule in which an overdrive gear ratio cannot be activated when the input device is placed at any other input position. In the example provided, operation of the PRNDL display 34 in the first display mode causes the transmission controller 18 to operate in the first automatic mode wherein the transmission controller 18 causes the transmission 14 to perform an upshift between a first gear ratio and a second gear ratio at a first engine rotational speed and operation of the PRNDL display in the second display mode causes the transmission controller 18 to operate in the second automatic mode wherein the transmission controller 18 causes the transmission 14 to perform an upshift between the first and second gear ratios at a second and possibly higher engine rotational speed. Accordingly, operation of the PRNDL display 34 in the first display mode may be associated with the fuel efficiency of vehicle 10, and operation of the PRNDL display 34 in the second display mode may be associated with higher performance.

Figure 8:
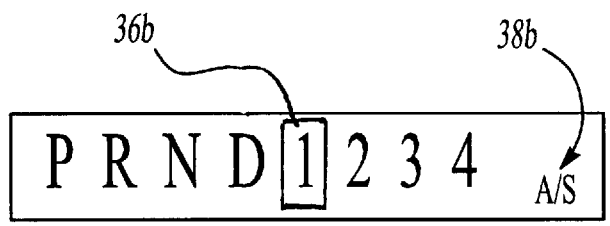
FIGS. 8 through 11 illustrate a portion of the display device of FIG. 2 as operated in a third operational mode.
Figure 9:
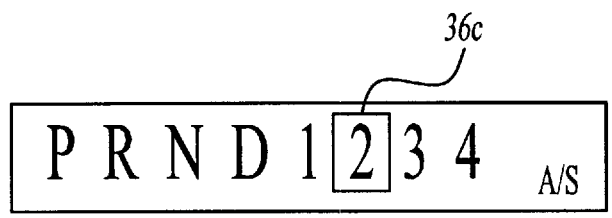

FIGS. 8 through 11 illustrate the operation of the PRNDL display 34 in a third display mode. A mode indicator 38b indicates to the vehicle operator that the display device 26 is being operated in the second display mode. In this example, the active gear ratio is displayed on the PRNDL display. Accordingly, to begin forward movement, the input device 22 is first positioned in the lowest gear ratio as shown in FIG. 8. As shown, only the display position 36b is illuminated. As the speed of vehicle 10 increases, the driver manipulates the input device 22 and causes transmission to upshift to the second gear ratio. The PRNDL display 34 updates, illuminating display position 36c as illustrated in FIG. 9.

Figure 10:
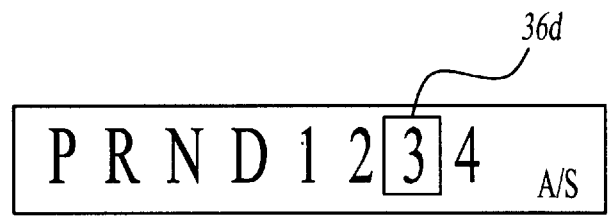

When the speed of vehicle 10 increases sufficiently, the driver manipulates the input device 22 and causes transmission to upshift to the third gear ratio. The PRNDL display 34 updates, illuminating display position 36d as illustrated in FIG. 10.

Figure 11:
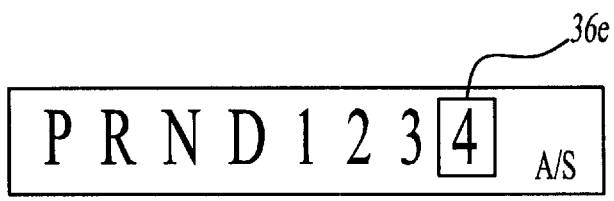

As the speed of vehicle 10 further increases, the driver manipulates the input device 22 and causes transmission to upshift to the fourth gear ratio. Accordingly, PRNDL display 34 updates as illustrated in FIG. 11. As shown, display position 36e is illuminated as is corresponds to the operation of transmission 14 in the fourth gear ratio, respectively.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A vehicle comprising:
   an automatic transmission having a plurality of gear ratios, each of the gear ratios being operable in an active mode for transmitting drive torque and an inactive mode;
   a plurality of first sensors adapted to sense a plurality of parameters and produce a plurality of respective first sensor signals, at least one of the plurality of sensors coupled to the automatic transmission and producing a gear ratio signal indicative of an active gear ratio;

an input device responsive to manipulation by a driver, the input device having a plurality of input positions;

at least one second sensor sensing the input position of the input device and producing a position signal;

a display switch that is selectively operated by the driver for producing at least a first display switch signal and a second display switch signal;

a controller coupled to the automatic transmission, the plurality of first sensors and the at least one second sensor, the controller receiving the plurality of first sensor signals including the gear ratio signal, the controller also receiving the position signal, the controller being operable in an automatic forward mode wherein the controller is configured to responsively shift the automatic transmission in response to the plurality of first sensor signals and the position signal, the controller also operable in a manual forward mode wherein the controller is configured to responsively shift the automatic transmission in response to the position signal; and a display device coupled and being responsive to the controller and the display switch, the display device operable in a first mode in response to receipt of the first display switch signal, wherein the display device displays the position of the input device and the active gear ratio, and the display device operable in a second mode in response to receipt of the second display switch signal, wherein the display device displays the position of only the active gear ratio;

wherein the display device is operable in the first and second display modes when the controller is in the automatic forward mode.

2. The vehicle of claim 1, wherein the controller is operable in a second automatic forward mode causing the display device to operate in a third mode wherein the display device displays only the position of the input device.

3. The vehicle of claim 1, wherein in response to the generation of the first display switch signal, the controller controls the operation of the transmission according to a first predefined shift schedule and wherein in response to the generation of the second display switch signal, the controller controls the operation of the transmission according to a second predefined shift schedule.

4. The vehicle of claim 3, wherein the first predefined shift schedule permits activation of an overdrive gear ratio that cannot be activated when another shift schedule is being employed.

5. The vehicle of claim 1, wherein the display device is a vacuum florescent display.

* * * * *